United States Patent
Shade

(10) Patent No.: US 10,371,176 B2
(45) Date of Patent: Aug. 6, 2019

(54) SELECTABLE FLOW DIVIDER DRIVE SYSTEM

(75) Inventor: Richard A. Shade, Hagerstown, MD (US)

(73) Assignee: JLG Industries, Inc., Hagerstown, MD (US)

(*) Notice: Subject to any disclaimer, the term of this patent is extended or adjusted under 35 U.S.C. 154(b) by 1446 days.

(21) Appl. No.: 13/703,967

(22) PCT Filed: Jul. 6, 2011

(86) PCT No.: PCT/US2011/043002
§ 371 (c)(1),
(2), (4) Date: Dec. 13, 2012

(87) PCT Pub. No.: WO2012/006303
PCT Pub. Date: Jan. 12, 2012

(65) Prior Publication Data
US 2013/0087411 A1    Apr. 11, 2013

Related U.S. Application Data

(60) Provisional application No. 61/361,732, filed on Jul. 6, 2010.

(51) Int. Cl.
*F15B 13/02*     (2006.01)
*B60K 7/00*      (2006.01)
(Continued)

(52) U.S. Cl.
CPC .......... *F15B 13/022* (2013.01); *B60K 7/0015* (2013.01); *B66F 11/04* (2013.01);
(Continued)

(58) Field of Classification Search
CPC ... F15B 13/022; B60K 7/0015; F16H 61/456; F16H 61/4035; B66F 11/04
(Continued)

(56) References Cited

U.S. PATENT DOCUMENTS 3,292,723 A    12/1966 Pinkerton et al.
3,777,459 A    12/1973 Elliott
(Continued)

FOREIGN PATENT DOCUMENTS

CN    101655015 A  *  2/2010
KR       611717 B1  *  8/2006

OTHER PUBLICATIONS

Extended European Search Report dated Mar. 13, 2018 issued in European Patent Application No. 11804266.2, 6 pp.

*Primary Examiner* — Abiy Teka
(74) *Attorney, Agent, or Firm* — Nixon & Vanderhye P.C.

(57) ABSTRACT

A selectable flow divider drive system includes a hydraulic fluid reservoir and a plurality of drive motors in fluid communication with the hydraulic fluid reservoir. A hydraulic pump is connected between the hydraulic fluid reservoir and the plurality of drive motors and directs hydraulic fluid from the hydraulic fluid reservoir to the plurality of motors. The hydraulic pump is operable in a high flow condition and a low flow condition. A flow divider component is interposed between the hydraulic pump and the plurality of motors. The flow divider component selectively divides hydraulic fluid flow to each of the plurality of drive motors, where a flow divider of the flow divider component is sized for the low flow condition of the hydraulic pump. A bypass valve is disposed upstream of the flow divider that selectively bypasses the flow divider when the hydraulic pump is operated in the high flow condition.

19 Claims, 3 Drawing Sheets

(51) Int. Cl.
    *F16H 61/4035* (2010.01)
    *F16H 61/456* (2010.01)
    *B66F 11/04* (2006.01)
    *B60K 17/14* (2006.01)

(52) U.S. Cl.
    CPC ....... *F16H 61/4035* (2013.01); *F16H 61/456* (2013.01); *B60K 17/14* (2013.01); *B60W 2720/30* (2013.01)

(58) Field of Classification Search
    USPC .................................... 60/484, 486; 91/514
    See application file for complete search history.

(56) References Cited

U.S. PATENT DOCUMENTS

| | | | | |
|---|---|---|---|---|
| 3,841,423 | A | * | 10/1974 | Holtkamp et al. ............ 180/6.3 |
| 3,889,759 | A | * | 6/1975 | Larson .............................. 172/3 |
| 3,997,017 | A | * | 12/1976 | Campbell ............ B60K 17/356 180/243 |
| 4,446,941 | A | * | 5/1984 | Laurich-Trost ............... 180/236 |
| 5,647,211 | A | | 7/1997 | Harber et al. |
| 5,720,360 | A | | 2/1998 | Clark et al. |
| 6,279,317 | B1 | * | 8/2001 | Morgan ......................... 60/413 |
| 6,378,653 | B1 | * | 4/2002 | Takahashi ................... 182/69.4 |
| 6,892,846 | B2 | | 5/2005 | Mellot et al. |
| 7,000,386 | B1 | * | 2/2006 | Morgan ................ F15B 13/022 60/419 |
| 2006/0076067 | A1 | * | 4/2006 | McInerney .......... B60K 28/165 137/625.64 |
| 2006/0278305 | A1 | * | 12/2006 | Barlow et al. ................ 144/4.1 |

* cited by examiner

| Boom Position | Drive Selection (Toggle Switch Location on the Platform Console) | | Engine Speed when Drive Control is Activated | Drive Pump Displacement | Flow Dividers | Approx. Max. Speed (MPH) |
|---|---|---|---|---|---|---|
| In Transport | Max Speed | 🔧 | High - 3000 RPM | 91% | By-Passed | 3.1 |
| | Min Engine Noise | 🔧 | Mid - 1800 RPM | 59% | Engaged | .96 |
| | Max Torque | 🔧 | High - 3000 RPM | 56% | Engaged | 1.5 |
| Out of Transport | Max Speed | 🔧 | High - 3000 RPM | 17% | Engaged | .6 |
| | Min Engine Noise | 🔧 | Mid - 1800 RPM | 37% | Engaged | .6 |
| | Max Torque | 🔧 | High - 3000 RPM | 17% | Engaged | .6 |

FIG. 3

SELECTABLE FLOW DIVIDER DRIVE SYSTEM

CROSS-REFERENCES TO RELATED APPLICATIONS

This application is the U.S. national phase of International Application No. PCT/US2011/043002 filed 6 Jul. 2011 which designated the U.S. and claims priority to U.S. Provisional Patent Application No. 61/361,732 filed 6 Jul. 2010, the entire contents of each of which are hereby incorporated by reference.

STATEMENT REGARDING FEDERALLY SPONSORED RESEARCH OR DEVELOPMENT (Not Applicable)

BACKGROUND OF THE INVENTION

The invention relates to aerial work platforms and, more particularly, to a hydraulic drive system for an aerial work platform.

Aerial Work Platforms (AWPs) typically use hydrostatic drives systems. They could be two- or four-wheel drive with a gear reduction and a hydraulic drive motor at each driven wheel. A hydraulic pump is typically driven directly from the engine and includes a network of traction valves or flow dividers to split the flow to each driven wheel. These flow dividers are intended to divide the total flow among each driven wheel even if one wheel would lose traction. The flow dividers typically include provisions for leakage or bypass of perfect flow division to allow for varying wheel speeds, as would be required for steering utilizing the Ackerman principle. Otherwise, wheels could be forced to slide during turns or the engine could stall.

If this bypass is too large, the flow division is compromised as a large portion of the flow could be lost to leakage. This situation is also seen when the flow dividers are sized for high flow conditions and used for the low flow conditions as the resulting leakage rate of the dividers can be a much larger portion of the available flow. This is of particular importance with AWPs since much of the driving is done at low flow conditions and with a migrating center of mass potentially unloading the ground contact load of the off side tires.

AWPs traditionally are designed with these traction valves sized for the high flow rate needed to achieve a max drive speed, which influences the efficiency and power requirements of not only high flow conditions but also low flow performance.

BRIEF SUMMARY OF THE INVENTION

The flow dividers according to preferred embodiments are sized for the low flow condition and are automatically or manually bypassed during high flow conditions. This arrangement allows for a more cost effective system as well as for improved flow division in low flow conditions, which is of particular importance for operation of an AWP.

In an exemplary embodiment, a selectable flow divider drive system includes a hydraulic fluid reservoir and a plurality of drive motors in fluid communication with the hydraulic fluid reservoir. A hydraulic pump is connected between the hydraulic fluid reservoir and the plurality of drive motors and directs hydraulic fluid from the hydraulic fluid reservoir to the plurality of motors. The hydraulic pump is operable in a high flow condition and a low flow condition. A flow divider component is interposed between the hydraulic pump and the plurality of motors. The flow divider component selectively divides hydraulic fluid flow to each of the plurality of drive motors, where a flow divider of the flow divider component is sized for the low flow condition of the hydraulic pump. A bypass valve is disposed upstream of the flow divider that selectively bypasses the flow divider when the hydraulic pump is operated in the high flow condition.

The system may additionally include a bypass solenoid valve in fluid communication with the bypass valve, where the bypass solenoid valve acts to selectively close the bypass valve. Preferably, the bypass valve is biased open. A filter may be interposed between the hydraulic pump and the bypass solenoid valve.

In one arrangement, the system includes four drive motors, where the flow divider component includes a plurality of flow dividers including one first stage flow divider and two second stage flow dividers, in a dividing mode, the first stage flow divider dividing the hydraulic fluid flow for input to the two second stage flow dividers, and the two second stage flow dividers further dividing the hydraulic fluid flow for input to the four drive motors. In a combining mode, exhaust fluid from the motors is directed to the second stage flow dividers, which combine the fluid for input to the first stage flow divider.

The system may also include a check valve associated with each of the drive motors that maintains a preset pressure through the drive system.

In another exemplary embodiment, an aerial work platform machine includes a vehicle chassis supporting a liftable work platform, a plurality of wheels secured to the vehicle chassis, and the selectable flow divider drive system for driving the plurality of wheels.

The aerial work platform machine may additionally include operator controls coupled with operating components for lifting and lowering the work platform and for driving the aerial work platform machine, and a control system receiving input from the operator controls and controlling operation of the operating components according to the input. The control system communicates with the selectable flow divider drive system and controls the selectable flow divider drive system according to operating parameters of the aerial work platform machine. The control system may control output of the hydraulic pump between the high flow condition and the low flow condition based on the operating parameters of the aerial work platform machine. The control system may be configured to energize the bypass solenoid valve when the output of the hydraulic pump is changed from the high flow condition to the low flow condition.

An operator preferably controls output of the hydraulic pump between the high flow condition and the low flow condition via the operator controls.

In yet another exemplary embodiment, a method of driving a plurality of hydraulic motors using a selectable flow divider drive system includes the steps of (a) interposing a flow divider component between a hydraulic pump and the plurality of hydraulic motors, the flow divider component selectively dividing hydraulic fluid flow to each of the plurality of drive motors; (b) selectively operating a hydraulic pump in a high flow condition and a low flow condition, the hydraulic pump directing hydraulic fluid from the hydraulic fluid reservoir to the plurality of hydraulic motors; and (c) bypassing a flow divider of the flow divider component when the hydraulic pump is operated in the high flow condition, wherein the flow divider is sized for the low flow condition of the hydraulic pump.

BRIEF DESCRIPTION OF THE DRAWINGS

These and other aspects and advantages will be described in detail with reference to the accompanying drawings, in which:

FIG. 3 shows exemplary conditions when the flow dividers are bypassed.

DETAILED DESCRIPTION OF THE INVENTION

Figure 1:
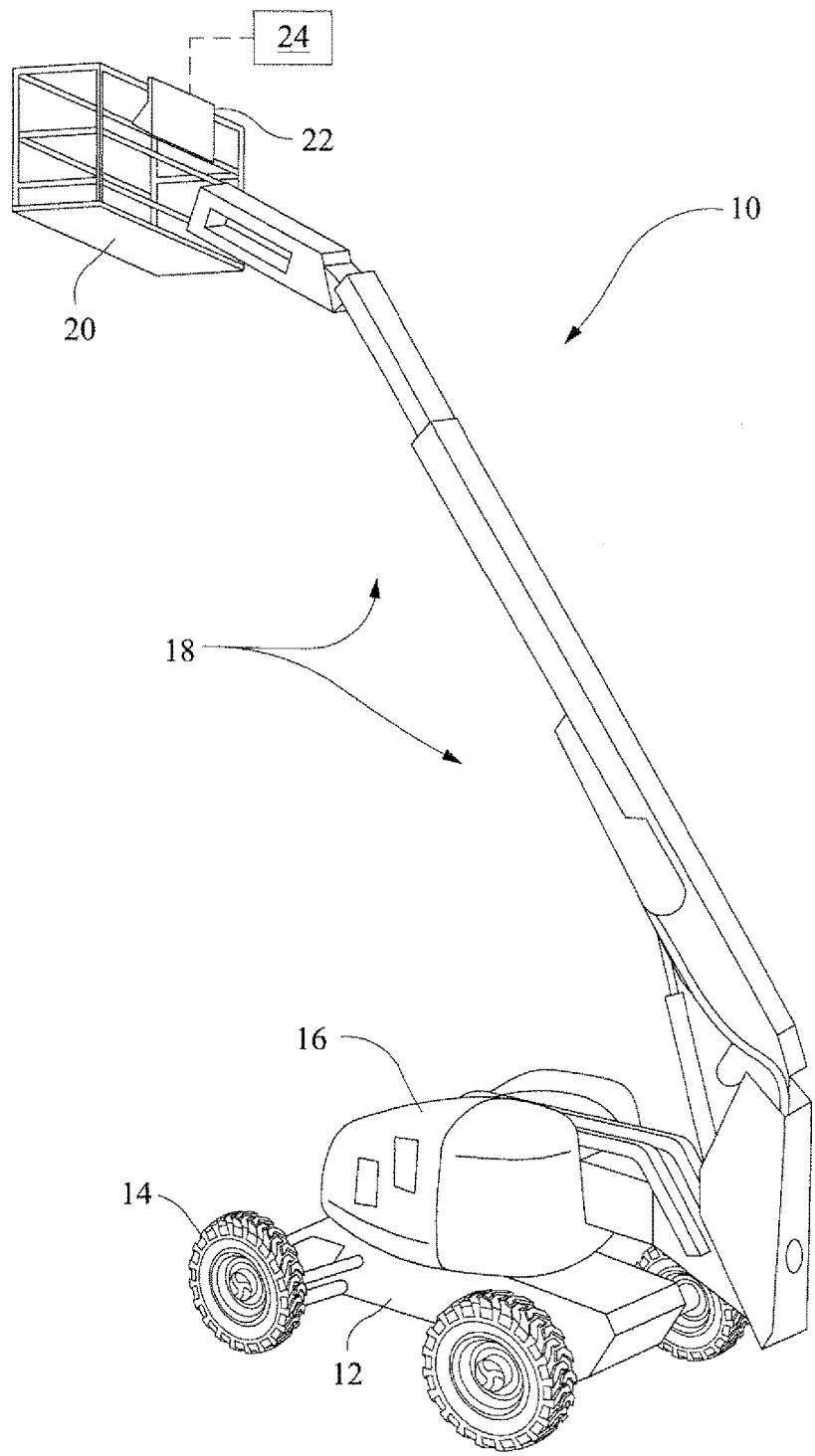
FIG. 1 shows an exemplary aerial work platform.

FIG. 1 shows an exemplary aerial work platform 10 for which the drive system of the invention is suitable. The machine 10 includes a chassis 12 supporting drive wheels 14. In the exemplary AWP shown, a turntable 16 is supported on the chassis 12. The turntable 16 supports a boom configuration 18, and a work platform 20 is supported at a distal end of the boom configuration 18. Operator controls 22 on the work platform 20 enable the operator to position the boom and drive the vehicle from the work platform 20. The operator controls 22 communicate with a control system 24 (shown schematically in FIG. 1) that controls operating parameters of the vehicle 10 based on input from the operator controls 22 as well as external sensors and operating conditions.

Figure 2:
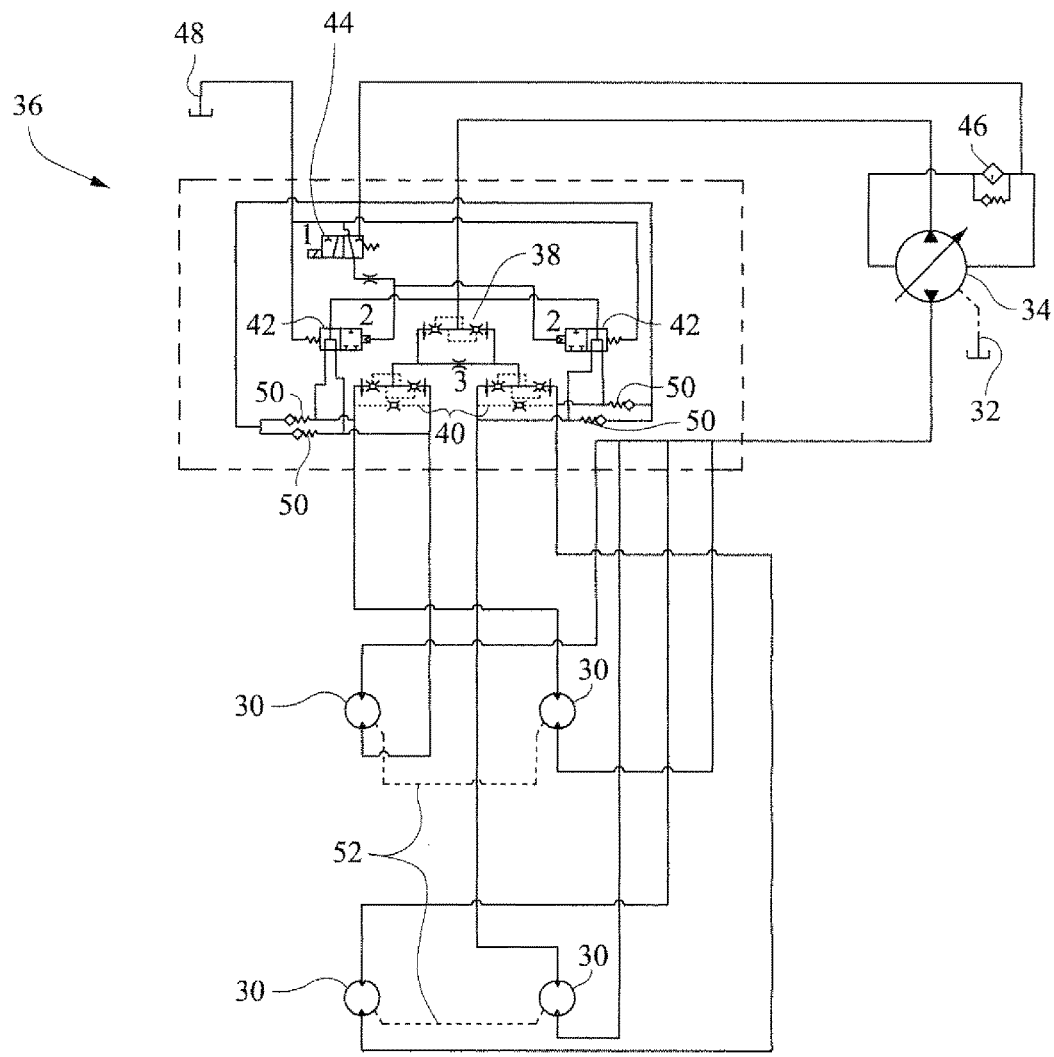
FIG. 2 is a schematic circuit diagram of the selectable flow divider drive system.

FIG. 2 is a schematic drawing of the selectable flow divider drive system for controlling drive functionality of the vehicle 10. A hydraulic motor 30 is associated with each wheel 14 for driving the wheel 14 in forward and reverse directions. The hydraulic motors 30 are driven with hydraulic fluid from a hydraulic fluid reservoir 32 via a pump 34. The pump 34 operates under the control of the controller 24 and circulates hydraulic fluid from the reservoir 32 to the hydraulic motors 30 via a flow divider component 36. The pump 34 is operable in a high flow condition (for max speed) and a low flow condition (for max torque/traction).

With continued reference to FIG. 2, the flow divider component 36 includes a plurality of traction valves or flow dividers 38, 40 interposed between the hydraulic pump 34 and the plurality of hydraulic motors 30. The flow dividers 38, 40 selectively divide the hydraulic fluid flow to each of the plurality of drive motors 30. In a preferred arrangement, one first stage flow divider 38 first divides the hydraulic fluid flow for input to two second stage flow dividers 40, which subsequently divide the hydraulic fluid flow for input to the four drive motors 30. In this flow direction, the flow dividers 38, 40 are in a dividing mode. When the flow direction is reversed, where the exhaust oil from the motors 30 enters the outlet ports of the second stage flow dividers 40, the second stage flow dividers 40 combine the fluid and send the combined flow to the outlet ports of the first stage flow divider 39. This flow direction is called a combining mode. In this manner, the vehicle can maintain traction control in both the forward and reverse directions. The flow dividers are also known as flow divider/combiners. As would be appreciated by those of ordinary skill in the art, the flow divider component 36 could be operable with a single flow divider providing hydraulic drive flow for only two wheels.

The flow divider component 36 also includes a bypass valve 42 disposed upstream of the flow dividers 38, 40. The bypass valve 42 is preferably biased open and serves to selectively bypass the flow dividers 38, 40 when the hydraulic pump 34 is operated in the high flow condition. A bypass solenoid valve 44 is provided in fluid communication with the bypass valves 42. When energized, the bypass solenoid valve 44 acts to selectively close the bypass valves 42.

Other components of the hydraulic circuit include a filter 46 interposed between the hydraulic pump 34 and the bypass solenoid valve 44. The filter 46 forms part of a circuit of hydraulic fluid circulating the hydraulic pump 34. A leakage reservoir 48 collects output leakage from the bypass valves 42, which occurs when the bypass valve solenoid 44 is energized, sending pressurized fluid to the bypass valve 42, which shifts the bypass valve 42 causing leakage in the spring chamber to vent to the reservoir 48. Additionally, a check valve 50 is associated with each of the drive motors 30 that serves to maintain a preset pressure through the drive system. The check valves 50 are configured such that upon the occurrence of a pressure loss in the system, and the pressure drops below a preset value, the check valves 50 are opened to maintain pressure and prevent cavitation. An exemplary preset pressure is 377 psi.

Leakage drains 52 are also provided for the motors 30.

As noted, the flow dividers 38, 40 are sized for the low flow condition of the hydraulic pump 34. As such, during high flow conditions, the flow dividers 38, 40 are manually (by the operator) or automatically (by the control system 24) bypassed. Thus, when driving at max speed, i.e., high flow condition (in an exemplary construction, about 3.1 mph), the flow dividers 38, 40 are bypassed by the bypass valves 42. This reduces pressure losses in the system, which in turn reduces the engine horsepower required, allowing a smaller engine to be selected for the application or more power available for increased performance. This also reduces heat in the hydraulic system, which in turn reduces leakage between components, thereby increasing the efficiency of the drive pump, drive motors, and related components.

When the operator manually selects the max torque position of the drive select switch on the operator control panel 22, the drive pump 34 changes its displacement from high flow condition (e.g., 2.75 cu in.) to low flow condition (e.g., 1.55 cu in.). This reduction in flow changes the speed of the machine from MAX to LOW (e.g., 3.1 to 1.5 mph), thereby reducing the engine horsepower requirement. This happens within a two second ramp down time.

At the same time, the bypass solenoid valve 44 is energized, which sends pilot pressure to the traction bypass valves 42. The pilot pressure shifts these valves 42 to their closed position, which blocks the flow path around the flow divider valves 38, 40. Fluid is now forced through the flow divider valves 38, 40 to divide the flow. There is a two second delay in this transition, which allows the pump flow rate to be reduced accordingly, then the bypass valves 42 are closed.

As noted, the flow divider valves 38, 40 are sized for the reduced flow rate. Traditional systems are not as efficient at lower flow rates because they are sized for higher flows. Smaller traction valves reduce manifold size and cost.

If the machine is "out of transport" (either the boom is raised or extended, or the turntable is swung substantially off center), the control system 24 automatically changes from max speed to max torque drive mode. This also activates the traction control system automatically as described in the manual operation above.

If the machine is driven on a slope or grade of 6° or more, the control system 24 automatically changes from max speed to max torque drive mode. This also activates the traction control system automatically. This allows the pump displacement to be reduced on grades which in-turn reduces the engine horsepower required.

Although not required, the system is further enhanced when combined with an oscillating axle system. When driving in the max speed condition, the flow dividers 38, 40 are bypassed. If a wheel looses contact with the ground, the flow will not be distributed to the other wheels, and loss of performance will result. An oscillating axle increases the likelihood of maintaining contact of all four wheels with the ground.

FIG. 3 shows exemplary conditions when the flow dividers 38, 40 are bypassed. As can be seen, the conditions where bypass results are limited, and when combined with an oscillating axle, this bypassing would rarely hinder the operation of the machine. In this system, the axle is free to float when the machine is "in transport."

The selectable flow divider drive system results in increased high speed efficiency. The ability to use a smaller engine results in reduced cost and reduced fuel consumption, while reduced heat generation results in extended oil life, a smaller hydraulic tank size, and improved high ambient temperature performance. Still further, the system results in improved low speed performance as less undesired flow divider leakage and thereby better wheel speed control. The use of smaller traction valves further reduces manufacturing costs. Additionally, changing the pump displacement to regulate the speed of the vehicle allows for the use of fixed motors, which is a further cost reduction. No extra valving is required to change motor displacement when using fixed motors, which also reduces costs. The hydraulic hosing in the drive system is sized for the max flow rate. In the max torque drive mode, the flow rate is reduced, so the pressure drop throughout the hydraulic hosing is reduced, thereby reducing heat and leakage in the system.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A selectable flow divider drive system comprising:
   a hydraulic fluid reservoir;
   a plurality of drive motors in fluid communication with the hydraulic fluid reservoir;
   a hydraulic pump connected between the hydraulic fluid reservoir and the plurality of drive motors, the hydraulic pump directing hydraulic fluid from the hydraulic fluid reservoir to the plurality of motors, wherein the hydraulic pump is operable in a high flow condition and a low flow condition;
   a flow divider component interposed between the hydraulic pump and the plurality of motors, the flow divider component selectively dividing hydraulic fluid flow to each of the plurality of drive motors, wherein a flow divider of the flow divider component is sized for the low flow condition of the hydraulic pump;
   a bypass valve disposed upstream of the flow divider, the bypass valve selectively bypassing the flow divider when the hydraulic pump is operated in the high flow condition; and
   a fluid circuit downstream of the flow divider component and the bypass valve, the fluid circuit directing the hydraulic fluid in parallel flow to each of the plurality of drive motors regardless of a position of the bypass valve.

2. A selectable flow divider drive system according to claim 1, further comprising a bypass solenoid valve in fluid communication with the bypass valve, the bypass solenoid valve acting to selectively close the bypass valve.

3. A selectable flow divider drive system according to claim 2, wherein the bypass valve is biased open.

4. A selectable flow divider drive system according to claim 2, further comprising a filter interposed between the hydraulic pump and the bypass solenoid valve.

5. A selectable flow divider drive system according to claim 1, comprising four drive motors, wherein the flow divider component comprises a plurality of flow dividers including one first stage flow divider and two second stage flow dividers, in a dividing mode, the first stage flow divider dividing the hydraulic fluid flow for input to the two second stage flow dividers, and the two second stage flow dividers further dividing the hydraulic fluid flow for input to the four drive motors, wherein the first stage flow divider and the second stage flow dividers are sized for the low flow condition of the hydraulic pump.

6. A selectable flow divider drive system according to claim 5, wherein in a combining mode, exhaust fluid from the motors is directed to the second stage flow dividers, which combine the fluid for input to the first stage flow divider.

7. A selectable flow divider drive system according to claim 1, further comprising a check valve associated with each of the drive motors, the check valve maintaining a preset pressure through the drive system.

8. An aerial work platform machine comprising:
   a vehicle chassis supporting a liftable work platform;
   a plurality of wheels secured to the vehicle chassis; and
   a selectable flow divider drive system for driving the plurality of wheels, the selectable flow divider drive system including:
   a hydraulic fluid reservoir,
   a plurality of drive motors in fluid communication with the hydraulic fluid reservoir, each of the plurality of drive motors driving one of the plurality of wheels,
   a hydraulic pump connected between the hydraulic fluid reservoir and the plurality of drive motors, the hydraulic pump directing hydraulic fluid from the hydraulic fluid reservoir to the plurality of motors, wherein the hydraulic pump is operable in a high flow condition and a low flow condition,
   a flow divider component interposed between the hydraulic pump and the plurality of motors, the flow divider component selectively dividing hydraulic fluid flow to each of the plurality of drive motors, wherein a flow divider of the flow divider component is sized for the low flow condition of the hydraulic pump,
   a bypass valve disposed upstream of the flow divider, the bypass valve selectively bypassing the flow divider when the hydraulic pump is operated in the high flow condition; and
   a fluid circuit downstream of the flow divider component and the bypass valve, the fluid circuit directing the hydraulic fluid in parallel flow to each of the plurality of drive motors regardless of a position of the bypass valve.

9. An aerial work platform machine according to claim 8, further comprising:
   operator controls coupled with operating components for lifting and lowering the work platform and for driving the aerial work platform machine; and
   a control system receiving input from the operator controls and controlling operation of the operating components according to said input, the control system communicating with the selectable flow divider drive system and controlling the selectable flow divider drive system according to operating parameters of the aerial work platform machine.

10. An aerial work platform machine according to claim 9, wherein the control system controls output of the hydraulic pump between the high flow condition and the low flow condition based on the operating parameters of the aerial work platform machine.

11. An aerial work platform machine according to claim 10, wherein the selectable flow divider drive system further comprises a bypass solenoid valve in fluid communication with the bypass valve, the bypass solenoid valve acting to selectively close the bypass valve.

12. An aerial work platform machine according to claim 11, wherein the control system is configured to energize the bypass solenoid valve when the output of the hydraulic pump is changed from the high flow condition to the low flow condition.

13. An aerial work platform machine according to claim 12, wherein an operator controls output of the hydraulic pump between the high flow condition and the low flow condition via the operator controls.

14. An aerial work platform machine according to claim 8, wherein the selectable flow divider drive system comprises four drive motors, and wherein the flow divider component comprises a plurality of flow dividers including one first stage flow divider and two second stage flow dividers, the first stage flow divider dividing the hydraulic fluid flow for input to the two second stage flow dividers, and the two second stage flow dividers further dividing the hydraulic fluid flow for input to the four drive motors, wherein the first stage flow divider and the second stage flow dividers are sized for the low flow condition of the hydraulic pump.

15. A method of driving a plurality of hydraulic motors using a selectable flow divider drive system, the method comprising:
(a) interposing a flow divider component between a hydraulic pump and the plurality of hydraulic motors, the flow divider component selectively dividing hydraulic fluid flow to each of the plurality of drive motors;
(b) selectively operating a hydraulic pump in a high flow condition and a low flow condition, the hydraulic pump directing hydraulic fluid from the hydraulic fluid reservoir to the plurality of hydraulic motors;
(c) bypassing a flow divider of the flow divider component with a bypass valve when the hydraulic pump is operated in the high flow condition, wherein the flow divider is sized for the low flow condition of the hydraulic pump;
(d) directing the hydraulic fluid to a fluid circuit downstream of the flow divider component and the bypass valve; and
(e) directing via the fluid circuit the hydraulic fluid in parallel flow to each of the plurality of drive motors regardless of a position of the bypass valve.

16. A method according to claim 15, wherein when the hydraulic pump is operated in the low flow condition, the method comprises energizing a bypass solenoid valve to close the bypass valve.

17. A method according to claim 16, wherein step (c) is practiced by de-energizing the bypass solenoid valve.

18. A method according to claim 15, wherein step (c) is practiced by manually bypassing the flow divider.

19. A method according to claim 15, wherein step (c) is practiced by automatically bypassing the flow divider according to operating parameters of the hydraulic motors.

* * * * *